April 19, 1966  HIDEYUKI MAEKAWA ETAL  3,247,064
MULTIVITAMIN TABLET STABILIZED WITH POROUS SILICA
Filed March 29, 1963
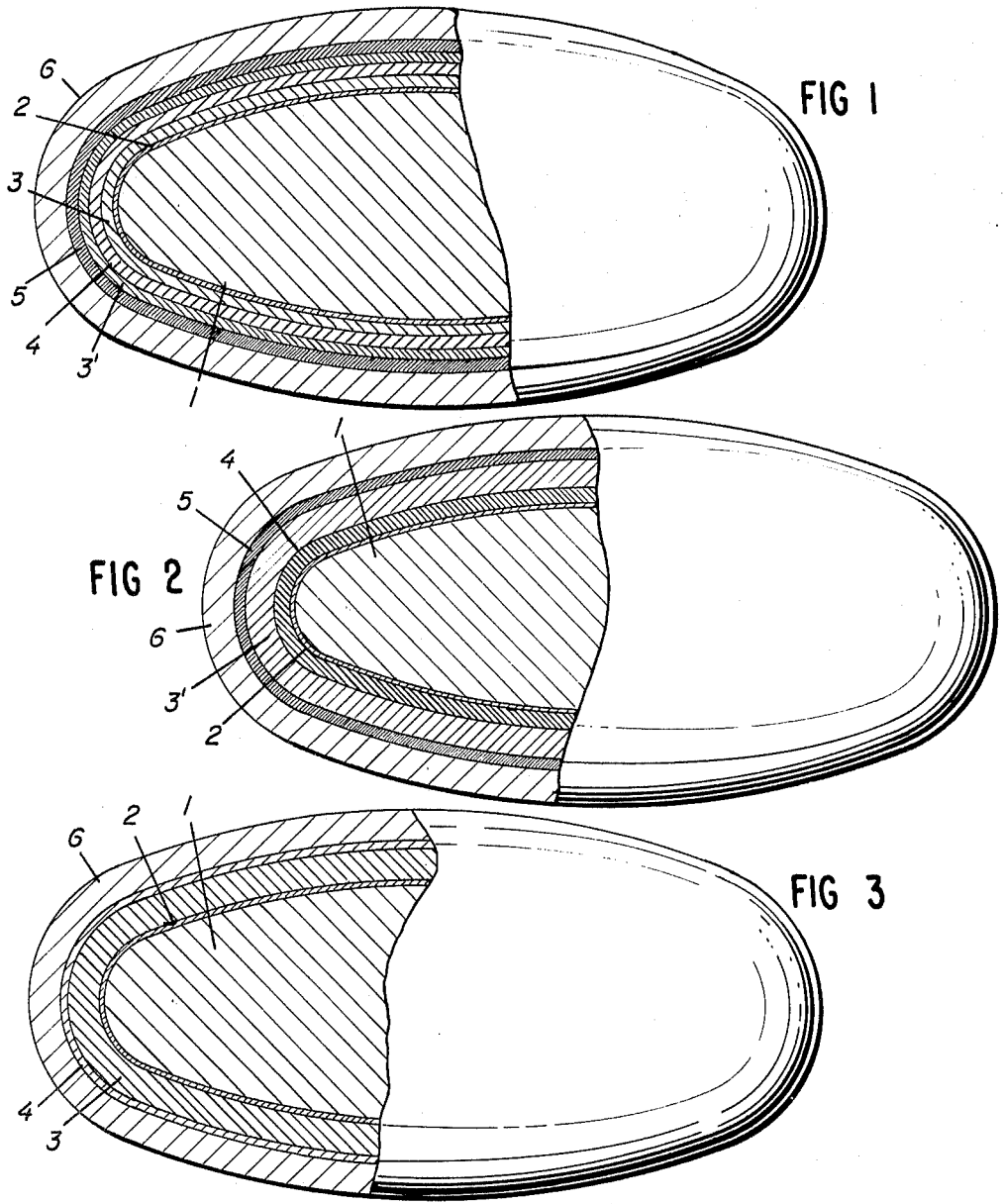
Hideyuki Maekawa
Kinzaburo Noda and
Yasushi Takagishi
INVENTORS
BY Wenderoth, Lind
and Ponack, ATTORNEYS 3,247,064
MULTIVITAMIN TABLET STABILIZED WITH
POROUS SILICA
Hideyuki Maekawa, Osaka, Kinzaburo Noda, Amagasaki, and Yasushi Takagishi, Nishinomiya, Japan, assignors to Shionogi & Co., Ltd., Osaka, Japan
Filed Mar. 29, 1963, Ser. No. 268,960
Claims priority, application Japan, Mar. 30, 1962, 37/16,295
6 Claims. (Cl. 167—81)

This invention relates to a multivitamin tablet and to a method for the preparation thereof. More particularly, this invention relates to a stable sugar coated multivitamin tablet at least containing fat-soluble or oily vitamins such as vitamin A, D and E, and additionally containing a pantothenic acid active substance, if need be, and to a method for its preparation. At present, multivitamin preparations are generally administered in the form of a sugar coated tablet, layer tablet or gelatin capsule, often with minerals. Particularly in the case of the sugar coated tablet, remarkable deterioration in its quality and appearance, so-called "age rupture" is occasionally seen in storage. Namely, the tablet ruptures (cracks) and its activity decreases.

The main object of the present invention is to provide a sugar coated multivitamin tablet resistant to such rupture. A further object of the invention is to provide a sugar coated multivitamin tablet stable as to its ingredients. Other objects of the invention will be apparent from the following description of the invention.

According to the inventors' investigation on the age rupture of sugar coated tablet, the reason and mechanism of this phenomenon can be analysed as:

(i) Gas production by the chemical decomposition of ingredients in the core of the tablet and increase of the gas pressure inside the sugar coating.

(ii) Infiltration of subcoating—penetration of the ingredients or their decomposition products into subcoating by the pressure of gases produced thereby—so that the mechanical strength of the sugar coating is weakened thereby.

(iii) The gas pressure still increases and finally leads to rupture of the outer sugar coating.

Through continuous study, the inventors further found that in a multivitamin preparation, the gas mainly consists of carbon dioxide produced by the decomposition of ascorbic acid, and fine gas production is enough to cause the rupture, because of any very small porosity inside the sugar coated tablet, and further, any oily ingredient in the core such as vitamin A and E easily penetrates into subcoating more than solid ingredients.

The following table shows a comparison of the time needed for rupture in connection with two kinds of samples containing either oily or powdered dry vitamin A and E, when they were stored at 45° C. in a closed glass container.

The latter is markedly better than the former.

Vitamin A and E used:  Days until the rupture occurs
  Oily _____ 62
  Powdered dry _____ 120

From this preliminary result, it can be presumed that inhibition of gas production by stabilizing medicaments in the core and further, elimination of oily ingredients from the core will be effective to prevent the age rupture. However, perfect stabilization of medical ingredients is, particularly in multivitamin preparation, hardly attained because the said preparation is usually composed of many kinds of chemically reactive ingredients and chemical interaction among them is very complicated, and moreover in some cases, the ingredient promoting the decomposition of the vitamins such as mineral salts must be added. Therefore, the suppression of the infiltration of subcoating, especially in the sugar coated tablet containing oily ingredients, becomes an important problem to prevent the age rupture.

From the above viewpoint, attempts have been made to form a layer containing an oily ingredient or vitamin A between the core and the outer sugar coating, instead of having the core of the tablet contain this ingredient. To carry this out, it is necessary to convert the oily medicament to a dispersible and fluidizable dry powder by mixing it with a proper diluent and then to apply this powder as dusting powder or to apply this powder as a syrup suspension during the process of sugar coating. But such substances as talc, precipitated calcium carbonate or kaolin which are usually used as dusting powder in application of subcoating, gave unsatisfactory results because these substances readily lose fluidity when adsorbed by even a small amount of oily vitamin A.

As the result of continuous investigation, the inventors found that a porous super fine powder, such as silicic acid, silicic anhydride (silica) and calcium silicate, is a good diluent for vitamin A and other oily medicaments. These powders do not lose their fluidity and dispersibility even when adsorbed by a large amount of oily vitamin A, and are almost chemically inactive to many medicaments. Such a stable vitamin A active powder, for example, can be obtained by mixing oily vitamin A and its stabilizing agent with silica. The following table shows a comparison of the time needed to rupture at 45° C. two kinds of sugar coated multivitamin tablets of which sample A has a thin layer containing oily vitamin A that has been formed by applying the above-mentioned vitamin A active powder as the dusting powder of the subcoating and sample B is an ordinary tablet wherein oily vitamin A is included in the core of the tablet.

Kind of sample:           Days until the rupture occurs
  A _____ over 180
  B _____ 62

Unexpectedly, the above sandwich construction of sample A is also effective not only to prevent the age rupture but for stabilizing the medicinal ingredients in the core of the tablet.

The following table shows a comparison of the stability of some vitamins in the above samples A and B. These samples equally contain oily vitamin A, thiamine hydrochloride, riboflavin, pyridoxin hydrochloride, cyanocobalamin, ascorbic acid, vitamin $D_2$, tocopherol, calcium pantothenate, folic acid and nicotinamide.

| Kind of Sample | Vitamin Retention percent (at 45° C., in a closed glass container) | | | | | |
| --- | --- | --- | --- | --- | --- | --- |
| | Vitamin A | | Thiamine | | Ascorbic acid | |
| | 60 days | 90 days | 60 days | 90 days | 60 days | 90 days |
| A | 88.6 | 85.2 | 90.4 | 80.0 | 96.7 | 92.0 |
| B | 80.3 | 76.8 | 83.4 | 76.2 | 95.6 | 90.8 |

During the investigation, it was further found that the above sandwich construction gave another unexpected benefit in connection with tablets containing calcium pantothenate. In multivitamin preparations, it is desirable that the pantothenate is isolated from the core of the tablet containing ascorbic acid and thiamine hydrochloride because these vitamins are incompatible. Accordingly, the pantothenate is customarily arranged either in a subcoating layer or in the outer sugar layer. However, the pantothenate in the subcoating is attacked by the penetrated substances from the core of the tablet, particularly, the oily medicaments. On the other hand, if the pantothenate is in the outer sugar layer, it may appear on the surface of the sugar coating by penetration and spoil said surface. Therefore, in the past, the arrangement of the pantothenate in many multivitamin preparation was a difficult problem to the pharmacist. However, according to the present discovery, the pantothenate is kept stable when it is included in the above vitamin A layer. In addition to this unexpected effect, this arrangement is also beneficial for pharmaceutical coating because the pantothenate aids sticking of the vitamin A active powder to the inner layer, such as the water-proof coating or the subcoating which surround the core of the tablet. The following table shows results of an accelerated test at 45° C. regarding two samples B and C which contain equal amounts of calcium pantothenate. In the sample B, the pantothenate is included in the core of the tablet and in the sample C the pantothenate is positioned in the vitamin A layer as in the predescribed sample A. Superiority of sample C is evident, particularly, in the stability of calcium pantothenate.

| Kind of Sample | Retention Percent (at 45° C.) | | | | | | |
|---|---|---|---|---|---|---|---|
| | Vitamin A | | Thiamin | | Ascorbic acid | | Calcium Panthothenate, 90 days |
| | 90 days | 150 days | 90 days | 150 days | 90 days | 150 days | |
| B | 76.8 | 61.0 | 74.2 | 70.2 | 90.8 | 88.0 | 31.0 |
| C | 86.0 | 83.0 | 94.4 | 86.0 | 98.0 | 95.0 | 79.0 |

The above study was still further developed to another fat-soluble vitamin such as vitamin D and a similar good result was obtained. For example, vitamin D arranged in coating after adsorbing it to porous silicious substance with or without a vehicle selected from the group consisting of fats, waxes, higher fatty acids, surface active agents and natural or synthesized high molecular substances incorporated with the stabilizing agent, is stable as compared with ordinary vitamin D in the core of the tablet. The following table shows a comparison of the stability of vitamin $D_2$ wherein the vitamin is included in the subcoating in sample D and in the core of the tablet in sample E.

Kind of sample:   Vitamin $D_2$, retention percent (at 45° C., 90 days)
D _____ 90
E _____ 51

As mentioned above, the present invention is concerned with a sugar-coated multivitamin tablet at least containing fat-soluble vitamins such as vitamin A, D, and E or the like with or without calcium pantothenate. The spirit of this invention is summarized as follows:

(1) Isolating the fat-soluble vitamin from the core of the tablet. The term "core of the tablet" as used herein signifies a central core of a sugar coated tablet made by compression or by molding and the term "the fat-soluble vitamin" signifies a fat-soluble or oily vitamin such as vitamin A, vitamin D or vitamin E homologues.

(2) Forming a layer containing the said fat-soluble vitamin around the core of the tablet.

(3) Including calcium pantothenate in the fat-soluble vitamin layer, if need be.

These ideas are realized by two general structures as described below.

(a) Forming a layer containing the fat-soluble vitamin directly on the core or (b) Forming said layer on the intermediate layer (subcoating) which surrounds the core In this invention, the two structures (a) and (b) can freely be used, however in practice, it is desirable that the fat-soluble vitamin layer be as remote as possible from the surface of the sugar-coating in order to prevent the staining of the surface by exudation of said vitamin. In other words, the fat-soluble vitamin layer should be as closely adjacent to the core of the tablet as possible.

Furthermore, minerals—salts of metals—which are provided in many multivitamin preparations should be separated from any vitamin; therefore, if the minerals must be compounded in the preparation, the structure of the sugar coated tablet according to the invention may have several different layers such as the fat-soluble vitamin layer, the mineral layer and the intermediate layer.

The accompanying drawings show, in vertical section, several typical tablet constructions according to the invention. In each of FIGS. 1 through 3, the reference numerals have the following significances:

1 designates the core tablet containing neither fat-soluble vitamin nor calcium pantothenate;
2 designates a water-proof coating;
3 designates a lower subcoating;
3' designates an upper subcoating;
4 designates a fat-soluble vitamin layer with or without the pantothenate;
5 designates a mineral layer; and
6 designates the outer sugar coating.

In FIG. 1, the fat-soluble vitamin layer 4 lies between the lower and upper subcoatings 3 and 3'. The lower subcoating 3 may be omitted, as shown in FIG. 2. The mineral layer 5 may also be omitted, as shown in FIG. 3. Other embodiments are possible within the scope of the instant disclosure, as will be evident to the skilled in the art. The tablets of the invention may be prepared by a well-known coating technique which consists of repeated application of syrup and dusting powder on the tablet cores by rolling in a pan. The fundamental process of the preparation is as follows:

(A) Preparation of the tablet core by compression or by molding.
(B) Water-proofing with a digestible water repellent such as shellac by spraying or soaking whereby the water-proof layer is formed on the core of the tablet.
(C) Formation of the subcoating by repeated application of syrup and dusting powder.
(D) Formation of the fat-soluble vitamin layer by repeated application of syrup and the aforesaid vitamin active powder.
(E) Formation of the mineral layer by application of syrup suspension or solution of the metal salts.
(F) Formation of the outer sugar layers with smoothing, coloring and polishing in the usual manner.

Silicic anhydride (silica) or calcium silicate give the best results, but other porous fine powdery substances can likewise be used. Additionally, pantothenyl alcohol can be used instead of calcium pantothenate. In application, the former can be sprinkled in its original condition with the fat-soluble vitamin active powder, because it is crystalline whereas, the latter should be applied with a solid adsorbent similar to the fat-soluble vitamin or in a form of aqueous solution because it is liquid.

It is preferable, in this invention, that some anti-oxidant such as a phenolic compound, e.g., as nordihydroguaiaretic acid (N.D.G.A.), butylated hydroxyanisole (B.H.A.), butylated hydroxytoluene (B.H.T.) or propylgallate, or an amine compound, such e.g. as N,N'-diphenyl-p-phenylenediamine, or a sulfur compound, such e.g. as phenothiazone, and some auxiliary antioxidant such as non-ionic surface active agent be intimately admixed with the fat-soluble vitamin powder independently or in combination at the time of application to enhance good life-stability of the said vitamin in the completed tablet.

The following examples set forth representative illustrative embodiments of the invention, without any limitation in the scope of the latter. Various changes will occur to the skilled in the art within such scope.

*Example 1.—Production of vitamin A active powder*

500 g. of polyoxyethylene monostearate was fused and 20 g. of nordihydroguaiaretic acid (N.D.G.A.) and 500 g. of vitamin A palmitate in vegetable oil (1,000,000 I.U/g.) were added thereto. The mixture was admixed well with agitation and cooled. To the mixture 980 g. of fine silica having about 150 m.²/g. of surface area was added and mixed, and passed through 40 mesh screen. Thus, about 2 kg. of vitamin A active powder having 250,000 I.U./g. were obtained.

*Example 2.—Production of multivitamin tablet (I)*

26,000 core tablets containing thiamine, riboflavin, pyridoxine, cyanocobalamin, vitamins $D_2$ E and $K_4$, folic acid, calcium pantothenate and nicotinamide were poured into an experimental coating pan rolling 25 r.p.m. and water-proofed with shellac. Then the tablets were treated six times with 130 ml. of syrup and 280 g. of talc each time to form the lower subcoating.

The syrup composition:
```
  Cane sugar, granular _____ g__  850
  Gelatin, granular _____ g__   15
  Gum acacia, granular _____ g__   10
  Distilled water _____ Proper quantity.
                                                ─────
      Total _____ ml__  1,000
```

The subcoated tablets were further treated four times with 130 ml. of syrup and 130 g. of vitamin A active powder prepared according to Example 1 each time to form the vitamin A layer. Finally, the tablets were further subcoated with dusting powder and syrup and finished with smoothing, coloring and polishing as usual manner. The finished tablet contains 5,000 I.U. of vitamin A and other ingredients. It has a construction similar to that of FIG. 1 except that the mineral layer is omitted.

*Example 3.—Production of multivitamin tablet (II)*

26,000 core tablets (similar to that of Example 2, except that the pantothenate was omitted) were treated as in Example 2 and the lower subcoating was formed. To the thus subcoated tablets, a dusting powder consisting of 195 g. of vitamin A active powder as in Example 1, and 65 g. of calcium pantothenate was applied with 130 ml. of syrup. This procedure was repeated four times and then the obtained tablets were further finished similarly as in the above. The finished tablet has a construction as shown in FIGURE 3 and contains 5,000 I.U. of vitamin A, 10 mg. of calcium pantothenate and other medicinal ingredients.

*Example 4.—Production of multivitamin tablet (III)*

The water-proofed tablets in Example 3 were coated with vitamin A layer as in Example 2, were further subcoated with syrup and dusting powder (calcium sulfate: talc=7:3), then were coated with mineral layer and lastly finished as in the preceding examples. This tablet has the construction of FIGURE 2.

*Example 5.—Preparation of vitamin D active powder (I)*

400 g. of hardened oil were fused and vitamin solution consisting of 2 g. of vitamin $D_2$ (40,000,000 I.U./g.), 2 g. of butylated hydroxyanisole and 100 ml. of benzene were admixed therewith. The resulting mixture was further admixed with 375 g. of silica, was passed through 60 mesh screen and dried to evaporate benzene. Thus, about 800 g. of vitamin D active powder containing 100,000 I.U./g. of vitamin $D_2$ were obtained.

*Example 6.—Preparation of vitamin D active powder (II)*

The vitamin D active powder in the above Example 5 is also obtained by the following variations.

200 g. of polyvinyl acetate, 2 g. of vitamin $D_2$ and 2 g. of propyl gallate were dissolved in 400 ml. of alcohol. The solution was admixed with 596 g. of silica as in Example 5 to give about 800 g. of vitamin $D_2$ active powder containing 100,000 I.U./g. of vitamin $D_2$.

*Example 7.—Production of multivitamin tablet (IV)*

26,000 core tablets containing thiamine, riboflavin, pyridoxine, ascorbic acid, cyanocobalamin, vitamins E and $K_4$, folic acid, calcium pantothenate and nicotinamide were water-proofed with shellac and treated to form lower subcoating as in Example 1. On the subcoating, 520 g. of vitamin A active powder, and 430 g. of calcium sulfate were sprinkled with 780 ml. of subcoating syrup repeatedly and, thereafter, they were treated as in Example 1. The resulting tablet contains 5,000 I.U. of vitamin A, 500 I.U. of vitamin D and other vitamins.

Having thus described our invention, we claim:

1. A sugar coated multivitamin tablet comprising: (1) an inner core containing a member selected from the group consisting of vitamin C, thiamin and mixtures thereof, (2) an outer sugar layer, and (3) an intermediate layer disposed between said inner core and said outer sugar layer; said intermediate layer consisting essentially of a fat-soluble vitamin in intimate admixture with finely powdered, porous silica.

2. A sugar coated multivitamin tablet according to claim 1, wherein the intermediate layer contains a stabilizing agent for the fat-soluble vitamin.

3. A sugar coated multivitamin tablet comprising: (1) an inner core containing a member selected from the group consisting of vitamin C, thiamin, and mixtures thereof, (2) an outer sugar layer, and (3) an intermediate layer disposed between said inner core and said outer sugar layer; said intermediate layer consisting essentially of a fat-soluble vitamin and calcium pantothenate in intimate admixture with finely powdered, porous silica.

4. A sugar coated multivitamin tablet according to claim 3, wherein the intermediate layer contains a stabilizing agent for the fat-soluble vitamin.

5. A sugar coated multivitamin tablet according to claim 1, wherein the inner core is directly encompassed by a waterproofing layer.

6. A sugar coated multivitamin tablet according to claim 3, wherein the inner core is directly encompassed by a waterproofing layer.

References Cited by the Examiner

UNITED STATES PATENTS

| | | | |
|---|---|---|---|
| 2,811,483 | 10/1957 | Aterno | 167—81 |
| 2,813,123 | 11/1957 | Valentine | 260—561 |
| 2,858,215 | 10/1958 | Espoy | 167—81 |
| 2,897,121 | 7/1959 | Wagner | 167—82 |
| 2,991,226 | 7/1961 | Millar | 167—82 |
| 3,080,293 | 3/1963 | Koff | 167—81 |
| 3,085,944 | 4/1963 | Valentine | 167—74 |

JULIAN S. LEVITT, *Primary Examiner.*

FRANK CACCIAPAGLIA, JR., *Examiner.*